United States Patent

Biancardi et al.

[15] 3,641,453

[45] Feb. 8, 1972

[54] MODIFIED OPEN CYCLE GAS LASER SYSTEM

[72] Inventors: Frank R. Biancardi, Vernon, Conn.; Gorken Melikian, Springfield, Mass.

[73] Assignee: United Aircraft Corporation, East Hartford, Conn.

[22] Filed: Sept. 10, 1969

[21] Appl. No.: 857,640

[52] U.S. Cl. .............................................. 331/94.5, 330/4.3
[51] Int. Cl. ...................... H01s 3/04, H01s 3/22, H01s 3/09
[58] Field of Search .................................. 331/94.5; 330/4.3

[56] References Cited

UNITED STATES PATENTS 3,391,281  7/1968  Eerkens ............................ 331/94.5 X
3,435,363  3/1969  Patel .................................... 331/94.5

Primary Examiner—Ronald L. Wibert
Assistant Examiner—R. J. Webster
Attorney—Melvin Pearson Williams

[57] ABSTRACT

A flowing gas "mixing" laser of the type which introduces a lasing gas into the laser chamber in proximity with the optical cavity, and provides excited energizing gas to the laser chamber separately, uses the cooling capacity of the liquefied lasing gas to improve the overall operation of the system. In one embodiment, the source of liquefied lasing gas is utilized as a coolant in a heat exchanger connected between the gas laser outflow and the inlet to the compressor used to cause gaseous flow through the laser. The compressor inlet temperature is reduced, thus permitting an increase in the capacity of the compressor and a reduction in the power of the prime mover which operates the compressor. In one variation of this embodiment, the lasing gas, from a liquefied source thereof is passed through the compressor inlet gas heat exchanger and is also utilized to cool the jacket of the laser chamber. In another variation of this embodiment, the lasing gas that is utilized as a coolant in a heat exchanger is vented to atmosphere, and the source of liquefied lasing gas also supplies the laser independently of the heat exchanger. In still another variation of this embodiment, a water cooled heat exchanger is used to precool the laser effluent before passing through the laser gas cooled heat exchanger. In another embodiment of the invention, the source of liquefied lasing gas is introduced in proximity with the laser chamber as a lasing gas and is separately used in heat exchangers to cool the inlet air and the gases leaving the laser chamber, and then vented to ambient. In each embodiment, the outflow of the compressor is vented to ambient, and the prime mover also powers an electric generator to operate a power supply that produces high-voltage DC current for a DC electric discharge plasma excitation means.

5 Claims, 4 Drawing Figures

MODIFIED OPEN CYCLE GAS LASER SYSTEM

BACKGROUND OF THE INVENTION

1. Field of Invention

This invention relates to gas lasers, and more particularly to an improved open cycle for gas lasers of the mixing type.

2. Description of the Prior Art

It is known in the prior art to produce laser radiation in a flowing gas laser which introduces the lasing gas in proximity with a laser cavity separately from the excited energizing gas. In such systems, it is necessary to supply separate sources of lasing gas and energizing gas to the laser chamber. Operation of the gas laser requires the use of a compressor or pump to cause flow of gases through the laser, at the mass flow and pressure conditions suitable for proper operation of the laser chamber.

Because of a wide variety of attractive applications for self-contained high-power laser units, such as mobile gas laser apparatus, it is desirable to limit the size and fuel capacity of a given system. The volumetric flow rate requirements of the compressor are dependent upon the temperature at the compressor inlet: with a decrease in inlet temperature, the compressor volumetric flow capacity requirement, and thus its size, is decreased. Similarly, the power requirements of the prime mover which drives the compressor may be decreased with a decrease in the compressor inlet temperature.

SUMMARY OF INVENTION

The object of the present invention is to provide an open cycle gas mixing flow laser system having improved peak power duration capability with respect to total system weight.

According to the present invention, a flowing gas laser system of the mixing type having separate inlets introducing an energizing gas and a lasing gas utilizes a liquefied source of at least one of said gases as a coolant in a heat exchange with at least one gas flow associated with said laser, to thereby lower the total enthalpy of the laser effluent, thus reducing demands upon the flow-producing compressor (or other pump). According further to the present invention, a heat exchange is provided between a source of liquefied gas and the laser effluent. According still further to the present invention, the heat exchange is provided between the one of said input gases and the liquefied source of another of said input gases.

The present invention permits the use of a relatively small and lightweight heat exchanger to greatly reduce the size of the prime mover, the size of the compressor, and the fuel requirements of the prime mover for a given level of operation over a given period of time, thereby to greatly reduce the overall size and weight of a gas laser system.

The foregoing and other objects, features and advantages of the present invention will become more apparent in the light of the following detailed description of preferred embodiments thereof, as illustrated in the accompanying drawings.

DESCRIPTION OF THE PREFERRED EMBODIMENT

Figure 1:
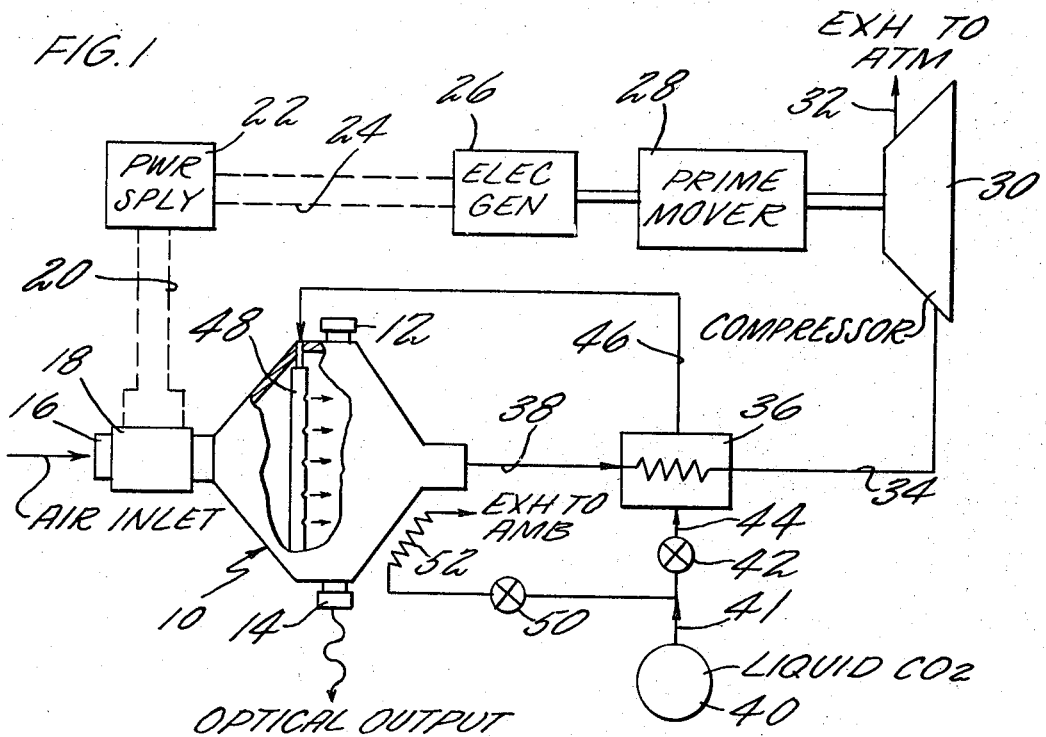
FIGS. 1—4 are simplified schematic diagrams of open cycle flowing gas laser systems of the mixing type in accordance with the present invention.

Referring now to FIG. 1, a gas laser 10 has a laser cavity including a pair of mirrors 12, 14, the optical output being taken from one of the mirrors, such as the mirror 14. An inlet 16 receives ambient air or it may receive other stored gases, such as $N_2$, or $N_2$ plus He for utilization as an energizing gas, the gases passing through a high-voltage DC discharge plasma excitation means 18 of the type known to the art. The excitation means 18 receives suitable high-voltage DC electric current through suitable wires 20 from a power supply 22. The power supply is connected by wires 24 to an electric generator 26 which is connected to the shaft of a prime mover 28. The prime mover 28 also drives a suitable pump such as a compressor 30, the outflow 32 of which is vented to atmosphere or other ambient condition. The compressor 30 is connected by a conduit 34 to a heat exchanger 36, the input to which is connected by a conduit 38 to the outflow of the laser 10. The coolant for the heat exchanger 36 is supplied by a source 40 of liquid $CO_2$ which is passed through an expansion valve 42 and a conduit 44 to the heat exchanger 36. As it leaves the heat exchanger, the $CO_2$ passes through a conduit 46 to be introduced into a suitable manifold, such as a spray bar 48, through which the $CO_2$ is injected into the laser chamber in proximity with the laser cavity, as is known in the art. Liquid $CO_2$ from a source 40 also flows through another expansion valve 50 to a heat exchange element 52 which is suitably disposed with respect to the jacket or outer shell of the laser 10 so as to tend to cool the laser. The outflow of the heat exchange element 52 is vented to atmosphere or other ambient condition. The relative contributions of the two heat exchangers 36, 52 depend on the conditions of operation established in any given implementation of this embodiment. For instance, the flow through the expansion valve 42 is necessarily limited to the flow desired at the spray bar 48 for proper operation of the laser. Since the total enthalpy within the laser 10 is dependent upon the enthalpy of the $CO_2$ at the spray bar 48 (together with other input enthalpies), the enthalpy in the conduit 34 is not altered by utilizing a $CO_2$ as an output coolant in the heat exchanger 36. However, it does permit a better heat exchange into the heat exchange element 52 by allowing the inside of the laser chamber to be at a somewhat higher temperature for a given temperature in the conduit 34. However, this may not be an entirely advantageous design condition, since it may degrade the performance of the laser. As an alternative to the embodiment of FIG. 1, the heat exchange element 52 may be supplied $CO_2$ from the conduit 46 instead of from the cond$it 41, so that the total flow through the heat exchanger 36 is more than the flow required at the spray bar 48, thus providing a net reduction in enthalpy as a result of the heat exchanger 36 in the conduit 34. Proper selection of flow rates and operating parameters, in either the embodiment shown in FIG. 1 or the modification thereof just described, can result typically in reductions of 50 to 60 percent in the volumetric flow rate capacity of the compressor 30, and a concomitant reduction in power which has to be supplied by the prime mover 28 into the compressor 30. It should be noted that the purpose of the expansion valves 42 and 50 is to achieve $CO_2$ at very low temperatures in a liquid-gaseous flow mixture. A large amount of heat can be absorbed at a constant temperature by vaporization of the liquefied $CO_2$. Since the temperature of the mixture can remain extremely low (minus 60° F.), the size of all the involved heat exchangers for a given rate of heat exchange can be much smaller than they would be without utilizing the expansion valve. If the expansion valves were not used, the $CO_2$ would begin to vaporize (assuming it is stored as a liquid) at the same temperature that it had assumed while pressurized (say ambient temperature of about 70° F.). Therefore, even though it could absorb large quantities of heat, it would do so at 70° and would be vaporizing at 70°; thus, there would be less of a temperature differential between the fluid to be cooled and the coolant, so that the effectiveness of the heat exchangers would be reduced and their size would have to be increased to offset this factor.

Figure 2:
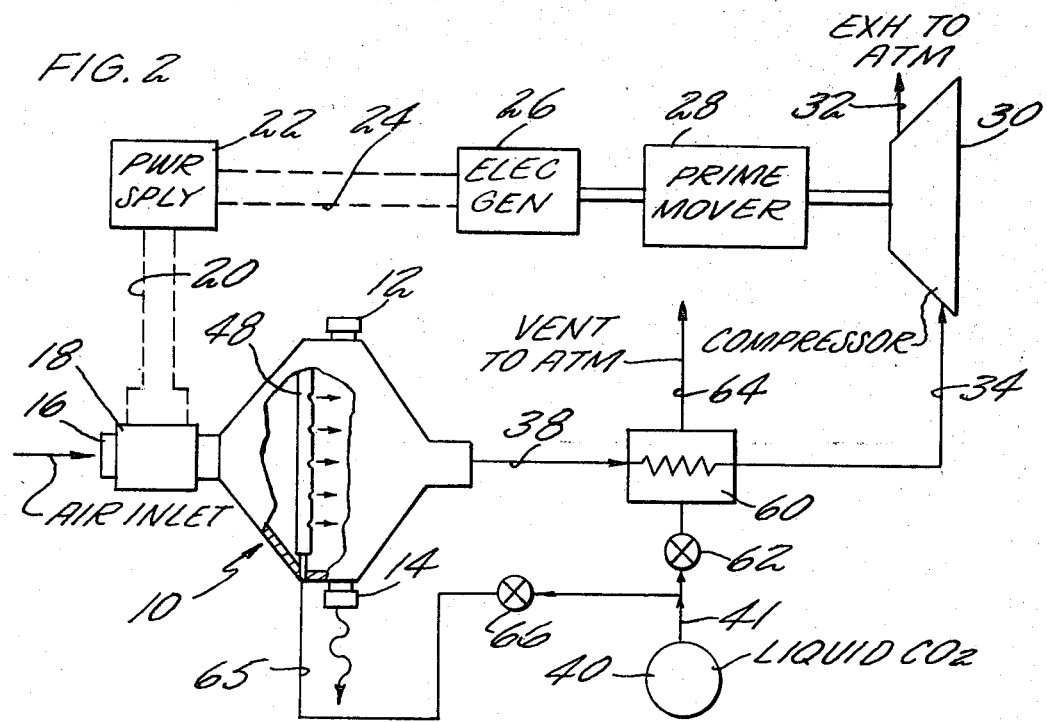

A second modification of the embodiment disclosed generally in FIG. 1 is illustrated in FIG. 2. Therein, a heat exchanger 60 receives the $CO_2$ from an expansion valve 62 supplied thereto by the conduit 41 from the source 40 of liquid $CO_2$. The outflow of the heat exchanger 60 is passed over a conduit 64 to atmosphere or other ambient condition. Thus, proper adjusting of the valve 62 can provide a desired flow rate of $CO_2$ through the heat exchanger 60 without regard for the flow rate requirement of the spray bar 48. The spray bar 48, on the other hand, is supplied $CO_2$ over a conduit 65 from a throttling valve 66 which is connected to the conduit 41. Thus, in the embodiment of FIG. 2, the $CO_2$ requirement for laser operation is separated from the cooling requirements of the heat exchanger 60. By establishing proper operating characteristics, compressor and prime mover reductions concomitant with those described with respect to FIG. 1 are possible. The embodiment of FIG. 2 simplifies the hardware and further may reduce system weight and size by eliminating the heat exchanger 52; on the other hand, depending upon actual operating conditions established, it could result in a greater drain on the source 40 of $CO_2$, thereby foreshortening the duration of operation in comparison with the embodiment of FIG. 1. The difference between the two embodiments, even though the heat exchanger 52 in FIG. 1 and the heat exchanger 60 in FIG. 2 both vent $CO_2$ to ambient, is that the temperature of the effluent from the heat exchanger 52 is higher than the temperature of the effluent from the heat exchanger 60. This is due to the temperature at the laser 10 being higher in the embodiment of FIG. 1 than is the effluent from the laser in the embodiment of Fig. 2, because $CO_2$ is entering the laser at a higher temperature in FIG. 1 than it is in the laser of FIG. 2. Thus, the trade-off is the hardware for the heat exchanger 52 (FIG. 1) in contrast with a slightly higher drain on the source 40 of $CO_2$ (FIG. 2).

Figure 3:
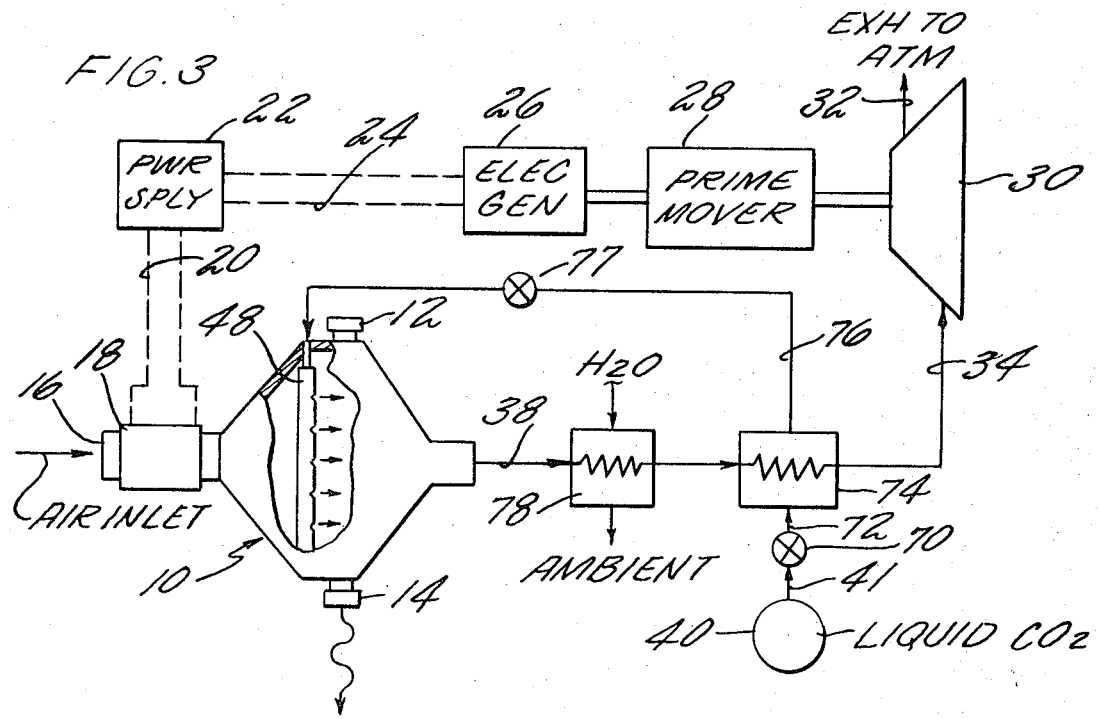

A further modification of the embodiment disclosed generally in FIG. 1 and 2 is illustrated in FIG. 3. Therein, the source 40 of $CO_2$ is connected by a conduit 41 to an expansion valve 70 which is connected by a conduit 72 to a heat exchanger 74. The outflow from the heat exchanger 74 is carried by a conduit 76 through a throttling valve 77, which allows control over the temperature in the heat exchanger 74 independently of the pressure at the spray bar 48. In this regard, the embodiment of FIG. 3 is similar to the embodiment of FIG. 1. However, instead of having a $CO_2$ heat exchanger 52 (FIG. 1) the embodiment of FIG. 3 utilizes a heat exchanger 78 which may be supplied with an auxiliary, high-vaporation-temperature coolant, such as water. The water may be supplied from any locally available source, or the heat exchanger 78 may be connected in an air-cooled, flowing coolant system. Other coolants of course could be utilized to suit the design expedients required in any given implementation of the present invention. The embodiment of FIG. 3, when compared with the embodiment of FIG. 1, again eliminates the heat exchanger 52, but requires the additional heat exchanger 78; further, a source of water must be supplied but this results in a substantial saving in the consumption rate of liquid $CO_2$. Even if a complete closed loop for the water cooling of the heat exchanger 78 were provided, because water has a significantly higher heat of vaporation than does the $CO_2$, savings in $CO_2$ and savings in the size of the compressor and prime mover can be obtained. Additionally, even if the water were thrown away (that is, vented to ambient condition) the total stored consumables required for a given system, including both liquid $CO_2$ and coolant, decreases. The heat exchanger 74 does not alter the temperature in the conduit 34 since the same total $CO_2$ enthalpy enters the system, but it does allow the laser 10 to run at a higher temperature since the $CO_2$ is warmed before being introduced into the laser chamber by the spray bar 48. With the laser outflow in conduit 38 at a higher temperature, there is a better heat exchange within the heat exchanger 78 for a given temperature of coolant therein.

Figure 4:
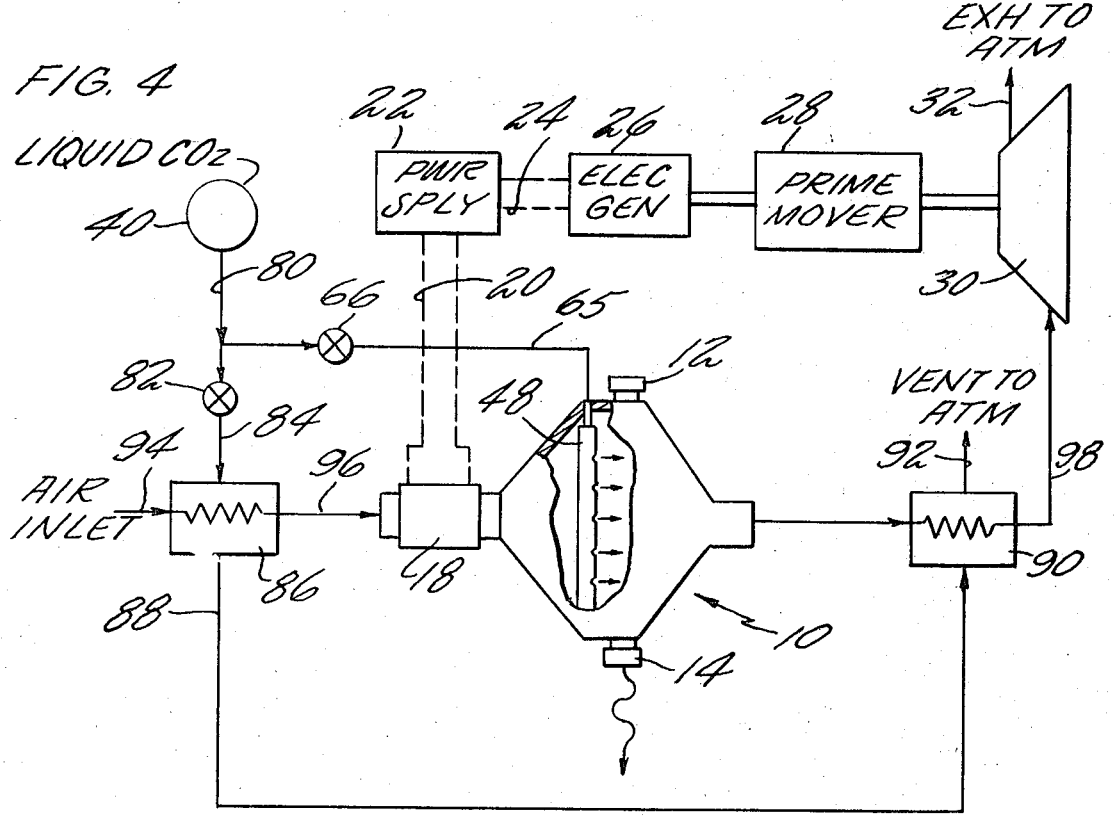

Another embodiment of the invention is illustrated in FIG. 4. Therein, the source 40 of liquid $CO_2$ is applied by a conduit 80 to an expansion valve 82 which is connected by a conduit 84 to a stored gas or air inlet precooler comprising a heat exchanger 86. The outflow of the heat exchanger 86 is connected by a conduit 88 to a heat exchanger 90 and then vented through the conduit 92 to ambient conditions. The heat exchanger 86 receives air from an air inlet 94 and passes the precooled air over a conduit 96 into the laser 10. The outflow of the laser 10 passes through heat exchanger 90 and into the compressor 30 by a conduit 98. The advantage of this embodiment is that it cools the inlet air to a point below ambient temperature, possibly in the range of between minus 20° to plus 40° F., before the air is passed into the laser. As disclosed in a copending application of the same assignee entitled HIGH POWER DENSITY LASER, Ser. No. 857,649 filed on even date herewith by Bullis and Brown, and in another copending application of the same assignee entitled EXTENDED CLOSED CYCLE GAS LASER SYSTEM, Ser. No. 857,646 filed on even date herewith by Biancardi and Melikian, high-power, high-density efficient lasers are extremely dependent upon the equilibrium temperature of the gaseous bath in the laser gain area. The present embodiment provides inlet gases at sufficiently low temperatures so as to promote extremely high power operation, in an open cycle configuration.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. An open cycle, flowing gas laser system for producing an output of laser energy, said system utilizing an electric discharge excited mixing laser and comprising:

a source of laser gas which is stored under pressure in a liquid condition;

means connected to the laser gas source for expanding the liquid whereby laser gas is formed;

a source of mixture gas;

means for electrically exciting the mixture gas; a laser chamber comprising an inlet means for receiving the excited mixture gas from the excitation means, means for admixing the laser gas with the mixture gas in the chamber to form a gas admixture whereby energy is transferred from the mixture gas to the laser gas and an energy level population inversion is established therein, and an outlet means for removing the admixture from the chamber;

means for conducting gas from the mixture source to the means for electrical excitation;

means for conducting the laser gas from the expanding means to the admixing means;

gas compressing means for exhausting the admixture from the laser chamber via the outlet means and discharging the admixture to ambient conditions;

regenerative heat exchange means having a heat source element and a heat sink element, the source element being connected in the flow between the outlet means and the pressure generating means, for removing heat from the admixture passing therethrough thereby cooling the admixture, the sink element being connected in the flow between the source of laser gas and the inlet means, for transferring to the laser gas passing therethrough, the heat transferred from the exhausted admixture;

prime mover means for activating the pressure generating means; and optical means positioned about said chamber for at least coupling optical laser energy from said chamber.

2. An open cycle, flowing gas laser system for producing an output of laser energy, said system utilizing an electric discharge excited mixing laser and comprising:

a source of laser gas which is stored under pressure in a liquid condition;

means connected to the laser gas source for expanding the liquid whereby laser gas is formed;

a source of mixture gas;

means for electrically exciting the mixture gas;

a laser chamber comprising an inlet means for receiving the excited mixture gas from the excitation means, means for admixing the laser gas with the mixture gas in the chamber to form a gas admixture whereby energy is transferred from the mixture gas to the laser gas and an energy level population inversion is established therein, and an outlet means for removing the admixture from the chamber;

means for conducting gas from the mixture source to the means for electrical excitation;

means for conducting the laser gas from the expanding means to the admixing means;

gas compressing means for exhausting the admixture from the laser chamber via the outlet means and discharging the admixture to ambient conditions;

regenerative heat exchange means having a heat source element and a heat sink element, the heat source element being connected in the flow between the outlet means and the pressure generating means for removing heat from the admixture passing therethrough cooling the admixture, the sink element being connected in the flow between the source of laser gas and ambient pressure condition, for transferring to the laser gas passing therethrough, the heat transferred from the exhausted admixture;

prime mover means for activating the pressure generating means; and optical means positioned about said chamber for at least coupling optical laser energy from said chamber.

3. The system according to claim 2 wherein a mixture gas heat exchange means is added to the system, the mixture gas heat exchange means having a heat source element and a heat sink element, the source element being connected in the flow between the source of mixture gas and the means for electrically exciting the mixture gas, for removing heat from the mixture gas passing therethrough thereby cooling the mixture gas, the sink element being connected in the flow between the source of laser gas and the regenerative heat exchange means, for transferring to the laser gas passing therethrough the heat transferred from the mixture gas.

4. A laser system according to claim 1 additionally comprising:
a laser chamber heat exchange means for exchanging heat with the chamber, said heat exchange means having a heat exchange element disposed in heat exchanging relationship with said laser chamber; and
means connected to the source of laser gas for passing a flow of laser gas through the heat exchange element, thereby cooling the laser chamber.

5. A gas laser system according to claim 1 additionally comprising a cooler heat exchanger having a heat source element located in the admixture flow path between the outlet means and said heat source element of the regenerative heat exchange, the cooler having a heat sink element responsive to a coolant flow for cooling the admixture from the laser chamber.

* * * * *